No. 815,698. PATENTED MAR. 20, 1906.
E. HAIMAN.
FARMING IMPLEMENT.
APPLICATION FILED OCT. 2, 1905.

2 SHEETS—SHEET 1.

ATTEST.

INVENTOR.
ELIAS HAIMAN.
BY H. F. Fisher ATTY.

No. 815,698. PATENTED MAR. 20, 1906.
E. HAIMAN.
FARMING IMPLEMENT.
APPLICATION FILED OCT. 2, 1905.
2 SHEETS—SHEET 2.
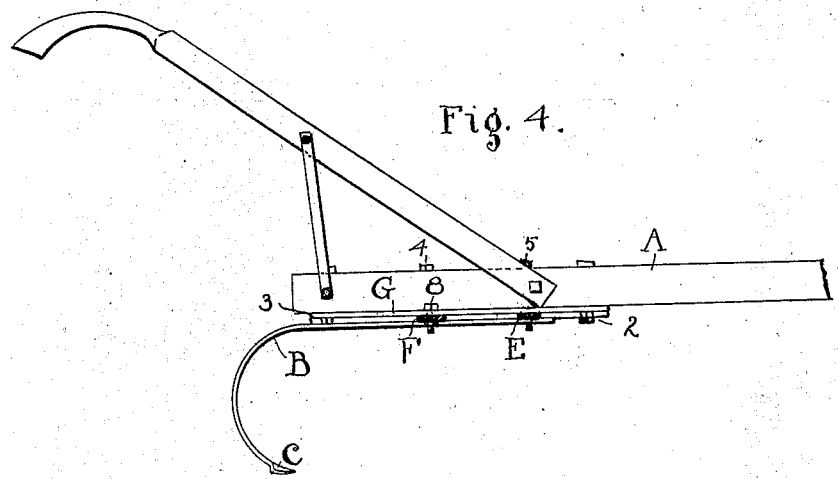
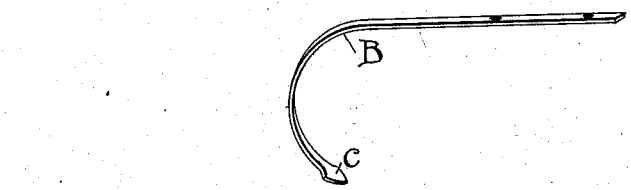
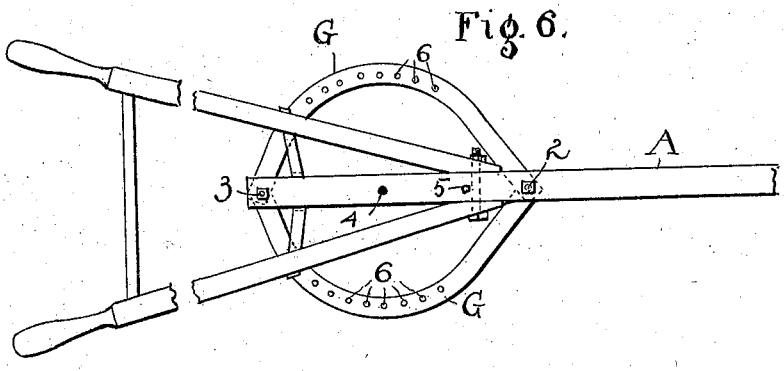
ATTEST.
INVENTOR.
ELIAS HAIMAN.
BY H. V. Fisher ATTY.

UNITED STATES PATENT OFFICE.

ELIAS HAIMAN, OF CLEVELAND, OHIO.

FARMING IMPLEMENT.

No. 815,698.     Specification of Letters Patent.     Patented March 20, 1906.

Application filed October 2, 1905. Serial No. 280,882.

*To all whom it may concern:*

Be it known that I, ELIAS HAIMAN, a citizen of the United States, residing at Cleveland, in the county of Cuyahoga and State of Ohio, have invented certain new and useful Improvements in Farming Implements; and I do declare that the following is a full, clear, and exact description of the invention, which will enable others skilled in the art to which it appertains to make and use the same.

My invention relates to improvements in farming implements, such as cultivators or harrows, which preferably have what are known as "spring-teeth" and are capable of various adjustments as to the positions of the tooth-bars in respect to each other and to the central beam, according to the work to be done, all substantially as shown and described, and particularly pointed out in the claims.

Figure 1:
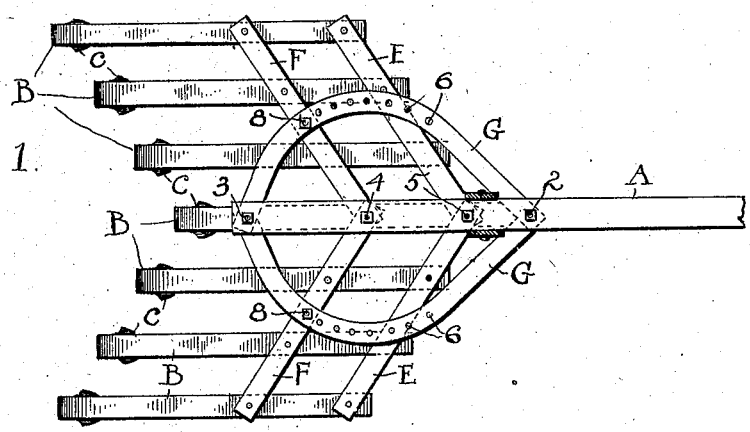
Figure 2:
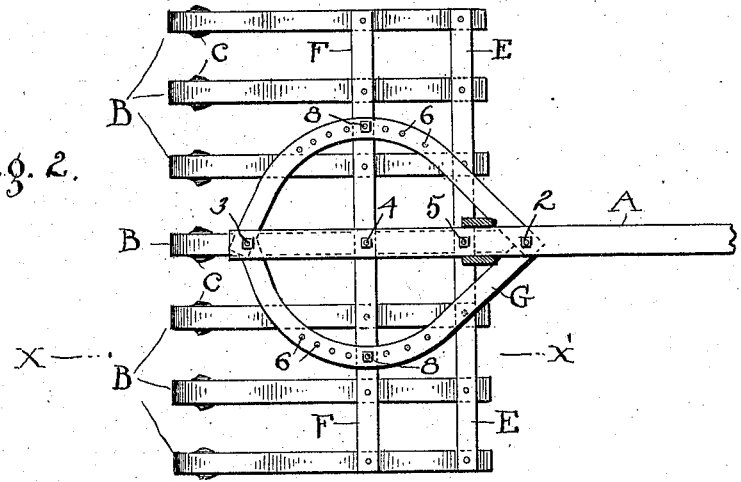
Figure 3:
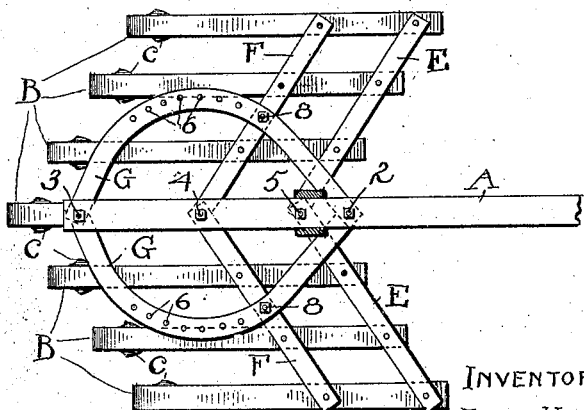

In the accompanying drawings, Figures 1, 2, and 3 are plan views of the invention, showing three of the several different adjustments of the tooth-bars which may be made and as hereinafter fully described. Fig. 4 is a side elevation of the implement, and Fig. 5 is a perspective view of one of the tooth-bars. Fig. 6 is a plan view of the main frame of the cultivator.

The implement as thus shown is adapted to be used as a cultivator, for which it is more specially designed, but is also adapted to be used as a harrow and in certain of its adjustments (not shown) may be used for still other purposes, as a practical farmer will readily see—as, for example, it might be used as a potato-digger.

A represents the central beam or bar of the main frame, to which the team is hitched, as usual, and B the respective tooth-bars, one in the center and three upon each side of beam A and all alike. These bars carry the teeth c, which are integral with the bars B in this instance, but not necessarily, and said bars are designed to hold parallel working relations in respect to each other and to the line of draft, as shown; but their relations in this particular might be more or less changed and not depart from the spirit of the invention.

E and F represent parallel supporting or carrying bars for the several tooth-bars, and the said carrying-bars are pivotally engaged at their inner ends with central beam A of the main frame and have the respective tooth-bars pivotally secured thereto at the point of their intersection, so that when the implement is to be adjusted into one or another of the three several positions shown or into any other available position the pivotal connection between the tooth-bars and the carrying-bars will be such as to afford an easy adjustment of the parts. Then in order to hold the said several bars in any preferred position I have provided the main frame with a pair of substantially segmental or semicircular braces G. These braces are a fixed part of the main frame with beam A and are bolted thereto at their ends 2 and 3 front and rear of the points of attachment 4 and 5 of the adjusting-bars E and F. Said segmental braces are each provided with a series of perforations 6 at their middle portions, with which the carrying-bars F are adapted to make adjusted connections, and bolts 8 are engaged through the holes in said segments and in a radial hole or holes in each of the said bars F, adapted to register with holes 6, according as one or another of the several adjusted positions of the cultivator is to be made. In the present instance the holes 6 in bars F for bolt 8 are on a radius from pivots 4 for said bars, and hence a single hole in each bar F is sufficient to make all the adjustments shown. For example, in Fig. 1 the adjusting-bars E and F are rearwardly inclined, which throws the tooth-bars farthest to the rear, and in Fig. 2 the bars E and F are at right angles to the central beam and the respective teeth c sustain the same transverse relations and are in alinement laterally.

In Fig. 3 the forward adjustment of the outer tooth-bars is shown, and this brings the outer teeth in advance of the next inner teeth, and so on, making a substantially V-shaped arrangement of the teeth and which is calculated to carry the earth inward from the outside. The reverse of this is true in Fig. 1, where the teeth c come into such relations as to cause the earth to flow outward from the center. I might of course bring the respective tooth-bars still nearer together than as shown herein, which would cultivate nearer to a row of plants; but all this adjustment is within the obvious possibilities of the implement, as are also other adjustments not indicated.

It has been noticed as a special and important feature in this implement that the segmental braces G with beam A constitute a rigid frame and which is never changed, while the respective bars B, E, and F are adjustable in respect thereto and are adjustably engaged therewith. The arrangement, furthermore, is so simple that only a single bolt on either side of the implement is needed to lock the parts and to effect any adjustment desired. In the present construction engagement is with bars F; but the segments might be moved forward and connect with bars E instead. The curve of each segment reaches out over the respective sides or wings of the implement to a point substantially midway thereof, and by thus getting connection with one of the carrying-bars at about its middle it is found sufficient to hold both said bars, as well as the tooth-bars, in right working relations. Thus a very simple as well as exceedingly efficient construction and arrangement of parts is provided, and the respective side carrying-bars and the tooth-bars are easily adjusted.

In the present construction I show two separate segmental bars G; but said bars might be constituted in one piece, if desired, and secured to either the top or the bottom of beam A, according as the carrying-bars E and F are connected at the top or bottom of said beam, as shown. The said bars E and F are at the bottom of beam A, and hence the segments are beneath also, but are arranged to come over or above the said bars.

What I claim is—

1. In farming implements, as a cultivator or harrow, a central beam, laterally-curved braces on opposite sides of said beam rigidly fixed thereto at both ends and having each a series of perforations in its outer curved portion, in combination with a pair of parallel tooth-bars on each side of said beam, transverse carrying-bars in pairs pivoted to said beam on each side and having said tooth-bars pivotally connected therewith, and means to adjustably lock said carrying-bars with the corresponding curved brace through the said perforations therein.

2. In an implement, as a cultivator or harrow, a rigid frame comprising a central beam and substantially segmental-shaped braces G fixed to said beam at their ends and provided with a series of holes 6 in their outer curved portions, in combination with the parallel carrying-bars E and F, one of said bars at each side adapted to be adjustably locked on the corresponding brace G, and parallel tooth-bars B on each side pivotally attached to both the carrying-bars E and F, respectively, whereby the parallel relations of said several bars B, E and F are maintained through all adjustments and said bars are rigidly fixed in all adjusted positions.

3. In a cultivator, a central beam and parallel tooth-bars, pivotal connections transversely between said beam and bars, and segments for adjusting said bars in respect to said beam and for fixing the beams rigidly in any adjusted position.

In testimony whereof I sign this specification in the presence of two witnesses.

ELIAS HAIMAN.

Witnesses:
R. B. MOSER,
F. P. HAMILTON.